United States Patent
Siwek et al.

(10) Patent No.: US 9,101,910 B2
(45) Date of Patent: Aug. 11, 2015

(54) METHOD OF PRODUCING AGENT FOR REMOVING DISSOLVED PHOSPHORUS COMPOUNDS FROM WATER AND AGENT FOR REMOVING DISSOLVED PHOSPHORUS COMPOUNDS FROM WATER

(71) Applicant: Zachodniopomorski Uniwersytet Technologiczny w Szczecinie, Szczecin (PL)

(72) Inventors: Hanna Siwek, Szczecin (PL); Malgorzata Wlodarczyk, Szczecin (PL); Artur Bartkowiak, Szczecin (PL); Katarzyna Sobecka, Szczecin (PL)

(73) Assignee: Zachodniopomorski Uniwersytet Technologiczny W Szczecinie, Szczecin (PL)

( * ) Notice: Subject to any disclaimer, the term of this patent is extended or adjusted under 35 U.S.C. 154(b) by 239 days.

(21) Appl. No.: 13/849,310

(22) Filed: Mar. 22, 2013

(65) Prior Publication Data

US 2014/0141243 A1 May 22, 2014

(51) Int. Cl.
*B01J 20/28* (2006.01)
*B01J 20/04* (2006.01)
*C02F 1/28* (2006.01)
*B01J 20/02* (2006.01)
*B01J 20/24* (2006.01)
*B01J 20/32* (2006.01)
*B01J 20/06* (2006.01)
*C02F 101/10* (2006.01)
*C02F 103/00* (2006.01)

(52) U.S. Cl.
CPC ........ *B01J 20/28023* (2013.01); *B01J 20/0229* (2013.01); *B01J 20/0244* (2013.01); *B01J 20/0281* (2013.01); *B01J 20/0288* (2013.01); *B01J 20/0296* (2013.01); *B01J 20/043* (2013.01); *B01J 20/046* (2013.01); *B01J 20/06* (2013.01); *B01J 20/24* (2013.01); *B01J 20/3212* (2013.01); *B01J 20/3219* (2013.01); *B01J 20/3236* (2013.01); *B01J 20/3274* (2013.01); *B01J 20/3293* (2013.01); *C02F 1/286* (2013.01); *C02F 1/288* (2013.01); *B01J 20/28028* (2013.01); *B01J 2220/485* (2013.01); *C02F 2101/105* (2013.01); *C02F 2103/007* (2013.01); *Y10T 428/2958* (2015.01)

(58) Field of Classification Search
CPC .................................................. B01J 20/28023
See application file for complete search history.

(56) References Cited

U.S. PATENT DOCUMENTS 6,350,383 B1 2/2002 Douglas ........................ 210/679
2006/0165607 A1* 7/2006 Tanaka ............................ 424/47

FOREIGN PATENT DOCUMENTS

EP    1 012 123    6/2000    ............. C02F 11/00

OTHER PUBLICATIONS

Chitrakar, et al., "Phosphate adsorption on synthetic goethite and akaganeite" *Journal of Colloid and Interface Science* 298: 602-608 (2006).
Couto, et al., "Oxygen plasma treatment of sisal fibres and polypropylene: Effects on mechanical properties of composites" *Polymer Engineering and Science* 42(4): 790-797 (2002).
Deppe, et al., "Phosphorus reduction in a shallow hypereutrophic reservoir by in-lake dosage of ferrous iron" *Wat. Res.* 36: 4525-4534 (2002).
Dittrich, et al., "Interactions between calcite precipitation (natural and artificial) and phosphorus cycle in the hardwater lake" *Hydrobiologia* 469: 49-57 (2002).
Eberhardt, et al., "Biosorbents prepared from wood particles treated with anionic polymer and iron salt: Effect of particle size on phosphate adsorption" *Bioresource Technology* 99: 626-630 (2008).
Eberhardt, et al., "Phosphate removal by refined aspen wood fiber treated with carboxymethyl cellulose and ferrous chloride" *Bioresource Technology* 97(18): 2371-2376 (2006).
Felix, et al., "Adhesion characteristics of oxygen plasma-treated rayon fibers" *Journal of Adhesion Science and Technology* 8(2): 163-180 (1994).
Geelhoed, et al., "Phosphate and sulfate adsorption on goethite: Single anion and competitive adsorption" *Geochemica Et Cosmochemica Acta* 61(12): 2389-2396 (1997).
Haghseresht, et al., "A novel lanthanum-modified bentonite, Phoslock, for phosphate removal from wastewaters" *Applied Clay Science* 46(2): 369-375 (2009).
Hullebusch, et al., "Environmental impact of two successive chemical treatments in a small shallow eutrophied lake: Part I. Case of aluminum sulphate" *Environmental Pollution* 120(3): 617-626 (2002).

(Continued)

*Primary Examiner* — Nathan T Leong
(74) *Attorney, Agent, or Firm* — David G. Rosenbaum; J. Peter Paredes; Rosenbaum IP, P.C.

(57) ABSTRACT

A method for the producing of an agent for the removal of dissolved phosphorus compounds from water, relying on the formation of the biopolymer metal compound system which is characterized by that, the natural plant fibers are subjected to the activation, subsequently the activated natural plant fibers are coated with biopolymer or derivatives thereof with the ionic character. The natural plant fibers are coated with at least one water-soluble polyvalent metal compound before or after coating the natural plant fibers with biopolymer or derivatives thereof with the ionic character. Such modified natural plant fibers form a composite fibrous material in the form of biopolymer hydrogel support crosslinked in the presence of water-soluble polyvalent metal compound support on the warp from natural fiber.

18 Claims, No Drawings

(56) References Cited

OTHER PUBLICATIONS

Jaeger, "Effects of hypolimnetic water aeration and iron-phosphate precipitation on the trophic level of Lake Krupunder" *Hydrobiologia* 275-276(1): 433-444 (1994).

Karahan, et al. "Effects of atmospheric pressure plasma treatments on certain properties of cotton fabrics" *Fibers Text East Eur.* 17: 19-22 (2009).

Liu, et al., "Synthesis and characterization of chitosan-g-poly(acrylic acid)/sodium humate superabsorbent" *Carbohydrate Polymers* 70: 166-173 (2007).

Malek, et al., "The Effect of Plasma Treatment on Some Properties of Cotton" *Iranian Polymer Journal* 12(4): 271-280 (2003).

Mimura, et al., "Separation of americium from europium by biopolymer microcapsules enclosing Cyanex 301 extractant" *J. Radioanal. Nucl. Chem.* 247(2): 375-379 (2001).

Min, et al., "Removal of Selenite and Chromate using Fe(III)-Doped Alginate Gels" *Water Environ. Research* 71(2): 169-175 (1999).

Nayak, et al., "Biosorption of toxic, heavy, no-carrier-added radionuclides by calcium alginate beads" *J. Radional. Nucl. Chem.* 267(1) : 59-65 (2005).

Perkins, et al., "The potential for phosphorus release across the sediment-water interface in an eutrophic reservoir dosed with ferric sulphate" *Wat. Res.*, 35(6): 1399-1406 (2001).

Prepas, et al., "Reduction of phosphorus and chlorophyll a concentrations following calcium carbonate and calcium hydroxide additions to hypereutrophic Figure Eight Lake, Alberta" *Environ. Sci. Technol.* 24(8): 1252-1258 (1990).

Tandyrak, et al., "Long-term changes of environmental conditions in a lake restored by phosphorus inactivation" *Limnol. Rev.* 1:263-270 (2001).

Williams, et al., "Time effects on morphology and bonding ability in mercerized natural fibers for composite reinforcement" *International Journal of Polymer Science* 2011: 1-9 (2011).

Wiśniewski, "Phosphate inactivation with iron chloride during sediment resuspension" *Lakes & Reservoirs Research and Management* 4(1-2): 65-73 (1999).

Yeon, et al., "Zirconium mesostructures immobilized in calcium alginate for phosphate removal" *Korean Journal of Chemical Engineering* 25(5): 1040-1046 (2008).

Zemljič, et al., "Characterization of cotton fibres modified by carboxylethyl cellulose" *Lenzing. Ber.* 85: 68-76 (2006).

* cited by examiner

METHOD OF PRODUCING AGENT FOR REMOVING DISSOLVED PHOSPHORUS COMPOUNDS FROM WATER AND AGENT FOR REMOVING DISSOLVED PHOSPHORUS COMPOUNDS FROM WATER

CROSS-REFERENCE TO RELATED APPLICATIONS

This application claims benefit of Polish Patent Application PL401690 filed Nov. 20, 2012, and incorporates said Polish application by reference in its entirety.

BACKGROUND

The present invention relates to a method for preparing an agent for removal of dissolved phosphorus compounds from water and an agent for removal of dissolved phosphorus compounds from water. This agent allows for binding and subsequent removal of phosphorus from water.

The world population growth and the changes in the energy management cause that the global demand for both food and biofuels is rising. The efficiency of agricultural production is closely related to the use of phosphate fertilizers for manufacturing of which currently utilized is 90% of all phosphorus obtained from mining phosphate rocks. As a result, larger and larger amounts of this element enter the phosphorus cycle in the environment. Both a sedimentic character of this cycle and a low mobility of phosphorus in the abiotic nature leads to its practically irreversible dissipation in the terrestrial and aquatic ecosystems. An increased fertility of these ecosystems, commonly called eutrophication, disturbs an equilibrium of the aquatic environments and limits the biodiversity of terrestrial environment. A loss of ecological balance is not the only side effect of an excessive dissipation of phosphorous. The natural phosphates similarly to petroleum are the irreversible resources. Although petroleum can be substituted by carbon or natural gas, there is no such substitute for phosphorus. Exhaustion of mineral resources of phosphates which are the main and cost-effective source of phosphorus on the Earth, would lead to deficiency of phosphorus fertilizers, and thereby to a threat to food production throughout the world. It has been estimated that currently recognized reserves will be exhausted over the next 130 years; the potential reserves may be estimated for more than 360 years.

Phosphorus does not disappear (as hydrocarbons) after "consumption", it can be practically subjected to infinite recycling, and this should be taken into account in agriculture and food distribution systems. Many studies have been carried out on the alternative sources of phosphorus in the human food chain, among them as the most important recognized are: municipal and industrial wastewaters, sewage sludge, farrows and waste from meat industry. The majority of developed technologies concern the recovery of phosphorus from wastewaters, among them the most numerous group constitute the crystallization methods of struvite ammonium-magnesium phosphate which properly granulated may be used as fertilizer. As follows from these studies, the problem of phosphorus recovery has a technical and economical character; currently working installations are not cost-effective.

There has been no solution for selective removal of excessive amounts of phosphorus from the aquatic ecosystems. The only method of phosphorus removal outside the aquatic ecosystem is dredging of bottoms sludge, which is a very expensive method, requires building of special silting fields, and additionally may cause irreversible negative alteration in the entire ecosystem. There are several methods aimed at binding of dissolved phosphorus compounds into the sparingly soluble forms. The essential drawback of these methods is the introduction of large quantity of chemical compounds no native for the aquatic ecosystems which remain in there together with phosphorus and constitute a potential source of secondary pollutants.

From publication MIN H. J., HERING J. G., *Water Environ. Res.* 71: 169-175 (1999), known is a modification of calcium alginate with the use of Fe(III), where the adsorbents were prepared for the removal from water the oxygen anions containing Se(IV), Cr(VI) and As(V). In the available literature the only system of this type for the adsorption of phosphate ions from the aqueous phase was an alginate/zirconium sulphate matrix which was characterized by better sorption properties than zirconium sulphate in the powdered form. [Yeon et al., Korean *J. Chem. Eng.*, 25(5): 1040, (2008)]. A very high price of zirconium salt and a complex technology for the preparation of systems thereof, requiring the application of surfactants, significantly restricts the possibility of practical utilization of said solution. The research carried out in the case of other biosorbents confirmed that the immobilization of iron in their structure significantly enhances the affinity of phosphate ions for these biopolymers [Eberhardt et al., Bioresour. Technol. 97, 2371 (2006) and Eberhardt and Min, Bioresour. Technol. 99: 626 (2008)].

SUMMARY OF THE INVENTION

A method for the producing of an agent for the removal of dissolved phosphorus compounds from water is disclosed, generally comprising: activating a cellulose material; coating the activated cellulose material with a biopolymer with an ionic character; coating the cellulose-biopolymer coated material with at least one water-soluble polyvalent metal compound; and cross-linking the cellulose-biopolymer material and the at least one water soluble polyvalent metal compound to obtain a composite fibrous hydrogel support material.

An agent for the removal of dissolved phosphorus compounds from water is disclosed, generally comprising: a composite fibrous material including a cellulose material coated with at least one biopolymer with an ionic character crosslinked in the presence at least one water soluble polyvalent metal compound.

A method for the producing of an agent for the removal of dissolved phosphorus compounds from water is disclosed, generally comprising: activating a cellulose material; coating the activated cellulose material with at least one water-soluble polyvalent metal compound; coating the cellulose-water-soluble polyvalent metal compound material with a biopolymer with an ionic character; and cross-linking the cellulose-biopolymer material and the at least one water soluble polyvalent metal compound to obtain a composite fibrous hydrogel support material.

A method for removing dissolved phosphorus compounds from water, is disclosed, generally comprising: applying a composite fibrous material to a water solution, wherein the composite fibrous material includes a cellulose material coated with at least one biopolymer with an ionic character crosslinked in the presence at least one water soluble polyvalent metal compound

DETAILED DESCRIPTION OF THE INVENTION

The objective of the present invention is to provide solutions enabling the preparation of hydrogel matrixes supported on the cellulose material or natural fibres with immobilized ions or polyvalent metal oxides having the sorption affinity for the phosphate ions.

A method for the producing of an agent for the removal of dissolved phosphorus compounds from water, relying on the formation of the biopolymer metal compound system is characterized in that the cellulose material or natural plant fibres are subjected to the activation. The activation is carried out by one of the known methods described herein.

Subsequently the activated cellulose material or natural plant fibres are coated or impregnated with at least one water-soluble polyvalent metal compound, and such impregnated fibres are coated with a biopolymer or derivatives thereof with an ionic character or with a mixture of biopolymer or derivatives thereof with the ionic character with at least one polyvalent metal compound which is water sparingly soluble. In one embodiment, the cellulose material may be natural or synthetic plant fibres. The cellulose material may be an organic compound with the formula $(C_6H_{10}O_5)n$, which a polysaccharide consisting of a linear chain of several hundred to over ten thousand $\beta(1\rightarrow4)$ linked D-glucose units. Also, cellulose material may include derivatives of cellulose, such as organic esters, inorganic esters, cellulose ethers, and the like. The cellulose material should be able to form fibres with mechanical resistance and be biodegradable. "Sparingly soluble" is solubility between about 1 g per 100 ml and about 0.1 g per 100 ml. Then crosslinking of the biopolymer or its derivatives with the ionic character takes place and coating of the fibre surface with biopolymer hydrogel layer crosslinked by at least one kind of polyvalent metal.

The impregnation of natural plant fibres can be also carried out in the inverse system, i.e. in the first stage with at least one biopolymer or derivatives thereof with the ionic character or with a mixture of biopolymer polysaccharide or derivatives thereof with ionic character and the polyvalent metal compound which is water sparingly soluble. Subsequently such impregnated natural plant fibres are coated with at least one water-soluble polyvalent metal compound. Then crosslinking of the biopolymer takes place and coating of the fibre surface with biopolymer hydrogel matrix/at least one polyvalent metal.

The chemical modification relying on the crosslinking of the biopolymers with anionic ions of polyvalent metals, for example $Fe^{+3}$ transforms the biopolymer into an adsorbent with anionic sorption capacity.

Also permissible is the gelation with contribution of other polyvalent metal ions, for example, manganese zinc salts which can increase the affinity of phosphate ions to the adsorbent or can be desired in case of utilization of the final product after adsorption of phosphate ions as a fertilizer.

The above described processes of coating the natural fibres with aqueous solutions of biopolymers and/or metal salts, also called as impregnation, can be realized owing to the application of the known and used in the textile industry immersing or spraying techniques or combined methods.

Subsequently such modified natural plant fibres are rinsed and dried to obtain a composite fibrous material in the form of biopolymer hydrogel support onto the warp made from natural fibres which is crosslinked in the presence of water-soluble polyvalent metal compound. The objective of rinsing is to remove an excess of components from previous operations, which did not undergo bonding. Drying can be carried out at room temperature and/or elevated, for example, from about 60° C. to 130° C., owing to that the fibre is deprived of water and its mass and volume is reduced.

The biopolymer is used or its derivatives with the ionic character mixed with at least one polyvalent metal compound which is water sparingly soluble. The application of solution of the biopolymer or its derivatives with the ionic character mixed with at least one polyvalent metal compound which is water sparingly soluble for the impregnation enables the immobilization of other metals, which can improve the sorption affinity of phosphate ions from one side, and from the other side they can be desired in the case of utilization of the agent after the adsorption, for example, as a fertilizer.

The "activation" of natural plant fibres relies on the chemical oxidation or mercerization or plasma modification or the adsorption of other macromolecular compounds with the ionic character, for example, carboxymethyl cellulose. The objective of activation is to increase the number of the reactive groups, most commonly in the form of anionic groups, for example, carboxyl, enabling the durable metal ions binding. The chemical activity of the basic component of natural fibres, which is cellulose, results from the occurrence of the three hydroxyl groups in their monomer unit, capable of forming the secondary hydrogen bonds. The hydroxyl groups of unmodified cellulose form two types of the hydrogen bonds: intramolecular, occurring between the hydroxyl groups of the same molecule and intermolecular, occurring between the molecules located in the vicinity. The intermolecular hydrogen bonds form a network compact enough to limit that the penetration of these zones even by the compounds with the hydrophilic character. The purpose of cellulose activation is to improve the availability of the internal surfaces of cellulose fibres and the amount of ionic groups in the form of the carboxylic groups. From publication of Liu et al., *Carbohydrate Polymers*. 70: 166-173 (2007) is known the activation relying on the oxidation. From publication of Williams et al., *International Journal of Polymer Science* Vol. 2011: 1-9 (2011), is known the activation relying on the mercerization. From publication of Zemljič et al, *Lenzing. Ber.* 85: 68-76 (2006) is known the activation relying on the adsorption of carboxymethyl cellulose (CMC). The activation may also rely on the plasma modification which was revealed in the publication Felix et al., *Journal of Adhesion Science and Technology* 8, 2, 163-180 (1994) and publication Couto et al., *Polymer Engineering and Science*, 42: 790-797 (2002), whereas the best results are achieved with the application oxygen plasma, under the influence of which on the polymer surface are formed the polar groups containing the oxygen, for example, carbonyl or carboxyl, playing the role of the nucleophilic active sites on which the metal ions may be adsorbed. The application of reagents with strong swelling properties such as soda lye, or the solutions of zinc chloride or hydrogen peroxide decreases the density of intermolecular hydrogen bonds what leads to the increase in the amount of reactive sites on the fibre surface. A similar effect may be achieved by exposing the natural fibres on the action of plasma or using the modification of this method, such as corona discharge. An additional advantage of these modifications is the possibility of formation of the reactive carboxyl groups on the fibre surface.

The above described methods of the surface activation may be used in the periodic or continuous systems for the modification of infinitely long strings, tapes and threads of the natural plant fibres. For example, in the wet modification processes the fibrous material is unrolled with a constant velocity and immersed in a bath containing the modification solution. The parameters of such continuous process (concentration of modification reagents, tank length and the velocity of moving fibrous product) are selected in such a way so that the contact time of modified fibrous product with modification liquid guarantee an appropriate effectiveness of modification.

The fibres are coated due to the application immersed or spraying techniques or combined methods. After drying, the natural plant fibres are spliced and/or winded. This permits for arbitrary shaping of fibre, e.g. the formation of large bunches, owing to which the fibre is more readily removed from water following phosphorus binding by the agent.

In one embodiment, the biopolymer or its derivatives of ionic character used are the naturally occurring polysaccharides extracted from sea algae or of microbiological origin, that is, alginate, pectin, agar, and/or carrageenons (kappa, iota and lambda differing in the degree of substitution by the sulfonic groups) and/or xanthate and/or gellan. These are anionic polymers, containing the carboxyl groups (alginate, xanthate and gellan), and sulphonic (carrageenons), which exhibit a large affinity to the cations in the neutral and alkaline environment and they undergo crosslinking with the contribution of polyvalent metal ions as a result of the ionic interactions. Alternative biopolymers extracted from derived from other organism such as plants and legumes may include guar gum, locust bean gum, and acacia gum. Alternatively, the biopolymers may include any polymer produced by a living organism, including, but not limited to: polysaccharides, polylactic acid (PLA), naturally occurring zein, poly-3-hydroxybutyrate, biopolymers derived from renewable biomass sources, such as vegetable fats and oils, corn starch, pea starch or microbiota, Polyhydroxyalkanoates (PHA), Polyamide 11 (PA 11), bio-derived polyethylene, or genetically modified bioplastics. Alternatively, synthetic polymers that are biodegradable may be substituted for the biopolymers, which may form a hydrogel matrix. The biopolymer must gel in presence of at least one water-soluble polyvalent metal cation.

In one embodiment, the sparingly water-soluble polyvalent metal compound used is calcium carbonate and/or calcium hydroxide and/or iron(II) carbonate and/or manganese(II) carbonate and/or manganese(II) hydroxide and/or manganese (IV) oxide and/or oxides and/or hydroxides of iron: magnetite, hematite limonite, goethite. The fibres coated with sparingly water-soluble metal oxides are immersed in the solution of gelling salt which is e.g. $CaCl_2$.

In other embodiments, the water soluble polyvalent metal compound used is calcium bicarbonate and/or calcium chloride and/or calcium nitrate(V) and/or calcium acetate and/or calcium oxalate and/or calcium formate and/or iron(III) chloride and/or iron(II) and/or iron(III) nitrate(V) and/or iron(II) nitrate(V) and/or iron(III) sulphate(VI) and/or iron(II) and/or iron(II) sulphate(VI) and/or iron(II) oxalate and/or iron(II) acetate and/or iron(III) oxalate and/or zinc sulphate(VI) and/or zinc chloride and/or zinc nitrate(V) and/or zinc acetate.

In accordance with the embodiments disclosed herein, there may be used any natural plant fibres containing cellulose in their composition as mentioned below in the Table 1, while fibre of cotton and/or sisal and/or hemp and/or flax and/or raffia may be used. The fibres subjected to the modification process are used in the form of threads, strings, ropes, woven fabrics, knitted fabrics, plaited fabrics, tapes or nets.

TABLE 1

| | |
|---|---|
| cotton | fibre originating from cotton seeds (*Gossypium*) |
| broom | fibre harvested from the phloem tissue of the plant *Cytisus scoparius* and/or *Spartium junceum* |
| ramie | fibre derived from the phloem tissue of the plant *Boehmeria nivea*: 1. *Boehmeria tenacissima* |
| sisal | fibre derived from agawa *sisalana* leaves |
| sunn | fibre originating from the phloem tissue of the plant *Crotalaria juncea* |
| henequen | fibre originating from the leaves of agawa *Fourcroydes* |
| maguey | fibre originating from the leaves of agawa *Cantala* |

TABLE 1-continued

| | |
|---|---|
| kapok | fibre originating from interior of kapok fruit (*Ceiba*) |
| flax | fibre originating from the phloem tissue of flax (*Linum usitatissimum*) |
| hemp | fibre originating from the phloem tissue of hemp (*Cannabis sativa*) |
| jute | fibre derived from the phloem tissue of *Corchorus olitorius* and *Corchorus* |
| kenaf | phloem tissue fibres derived from the following plant species: *Hibiscus cannabinus Hibiscus sabdariffa*, *Abultilon avicennae*, *Urena lobata*, *Urena Sinuata*; |
| abaca (manila) | fibre originating from the leaves of plant *Musa textilis* |
| alfa | fibre originating from the leaves of plant *Stipa tenacissima* |
| coconut | fibre derived from coconut fruit *Cocos nucifera* |
| raffia | fibre derived from the leaves of coniferous palm *Arecaceae* |

An agent for removal of dissolved phosphorus compounds from water, according to the embodiments disclosed herein, containing a biopolymer and the metal compounds, is characterized by that said agent has the form of composite fibrous material, being the hydrogel supports on the warp made from natural fibre, wherein the hydrogel support constitutes the biopolymer or its derivatives of the ionic character which are crosslinked in the presence of at least one water soluble polyvalent metal compound.

The composite fibrous material has built-in at least one sparingly water-soluble polyvalent metal compound.

A "sparingly water-soluble polyvalent metal compound" constitutes calcium carbonate and/or calcium hydroxide and/or iron(II) carbonate and/or manganese(II) carbonate and/or manganese(II) hydroxide and/or manganese(IV) oxide and/or oxides and/or hydroxides of iron: magnetite, hematite limonite, goethite.

The biopolymer or its derivatives of the ionic character constitutes the naturally occurring polysaccharides extracted from see algae or the microbiological origin, that is, alginate and/or carrageenons and/or xanthate and/or gellan. These are anionic polymers, containing the carboxyl groups (alginate, xanthate and gellan), and sulphonic (carrageenons), which exhibit a large affinity to the cations in the neutral and alkaline environment and they undergo crosslinking with the contribution of polyvalent metal ions as a result of the ionic interactions.

A "water soluble polyvalent metal compound" constitutes calcium bicarbonate and/or calcium chloride and/or calcium nitrate(V) and/or calcium acetate and/or calcium oxalate and/or calcium formate and/or iron(III) chloride and/or iron(II) and/or iron(III) nitrate(V) and/or iron(II) nitrate(V) and/or iron(III) sulphate(VI) and/or iron(II) and/or iron(II) sulphate (VI) and/or iron(II) oxalate and/or iron(II) acetate and/or iron(III) oxalate and/or The natural fibre may constitute any natural plant fibre mentioned in the table 1, while it is preferable to use a fibre of cotton and/or sisal and/or hemp and/or flax and/or raffia. The fibres have the form of threads, strings, ropes, woven fabrics, knitted fabrics, plaited fabrics, tapes or nets.

The embodiments disclosed herein constitute a solution enabling the removal of phosphorus from natural aquatic ecosystems via multifunctionality. Firstly, the solution enables binding of dissolved phosphorus compounds in the aquatic environment, thereby, after application it limits the eutrophication. The second feature of adsorbent prepared, according to the embodiments disclosed herein, is the possibility of removal of bound phosphorous outside the aquatic ecosystem. All currently used agents for the phosphorus binding in the aquatic environment, do not enable their removal outside this environment together with the adsorbed phosphorus without the interference into the ecosystem as it takes place e.g. during bottom sediments dredging. In contrast to the best adsorbents and coagulants amongst the most commonly used, with the application of proposed agent in the embodiments disclosed herein, there is a possibility of various formation of the support and the removal of such support at any time from the aquatic environment. Secondly, proposed natural and biodegradable adsorbents, after their saturation with phosphorus, may be regenerated or after drying may constitute ready-to-use phosphorus fertilizer. In accordance with the embodiments disclosed herein, there is provided a method of preparing a totally biodegradable agent the components of which are the natural substances, therefore, practically without any additional processes, after the removal from the aquatic environment it may be reused as a source of phosphorus e.g. in the agricultural production. An additional asset of utilization of this agent for the agricultural purposes is polysaccharides derived from see algae, applied to its production. Over the recent years, the extracts from algae have been used as the fertilizers e.g. in the ecological agriculture. The application of biopreparations, being an extract from see algae (e.g. Bio-algeen S 90 Plus 2 or Kelpak) facilitates the expansion of the root system of plants, stimulates their growth, enhances the resistance against stress and pathogens attack and the crop quality [Prę edka L. Agrochemia 1:11 (1995) and Sulewska et al. Monography, Vol. 2. Selected aspects of ecological agriculture in Poland, pp. 203-209. PIMR, Poznan (2005)]. The phosphorus binding with the application of this agent may proceed through (i) the adsorption of soluble and insoluble forms of phosphorus with the contribution of immobilized ions of metals or polyvalent metals and (ii) through the gradual release of these ions. An agent according to the embodiments disclosed herein may be freely formed, which allows for its optional removal along with adsorbed phosphorus from the aquatic environment and its regeneration. The current state of the art indicates that in the case of all agents proposed so far, there are no possibilities of their removal from the aquatic environment.

The embodiments disclosed herein are now described in more detail by references to the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the embodiments disclosed herein and/or the scope of the appended claims.

Example I

Activation of String from Natural Plant Fibre

The activation of fibres is carried out with non-selective oxidizing agent that is hydrogen peroxide. The pieces of strings from cotton, sisal, hemp, flax having the length from about 10 cm and diameter of about 1.0-about 1.5 mm (in the case of raffia-tape with dimensions: length about 10 cm; thickness 1 mm and width 3 mm) are placed in a solution with the concentration of about 5% and boiled for about 1 hour. Subsequently they are rinsed in distilled water. The thus obtained fibres have enhanced hydrophilic properties due to the carboxyl groups formation as a result of oxidation.

Example II

Activation of String from Natural Plant Fibre

The pieces of strings from cotton, sisal, hemp, flax of the length from about 10 cm and diameter of about 1.0-about 1.5 mm (in the case of raffia-tape with dimensions: length about 10 cm; thickness about 1 mm and width about 3 mm) are subjected to alkalization relying on their preparation in the NaOH aqueous solution of concentration of about 7% for about 2 hours at room temperature. The fibres after removal from the solution are rinsed with 1% solution of acetic acid and then washed in water until the wash water has a neutral pH. The alkalization process removes the external layer of cellulosic fibre, owing to which facilitated is a further diffusion of metal ions or biopolymer molecules into the inside of the fibre. The permeation of sodium hydroxide to the crystalline regions of native cellulose causes the formation of alkylcellulose. Then, after washing out of unreacted NaOH, the regenerated cellulose is formed.

Thus obtained fibres have enhanced hydrophilic properties.

Example III

Activation of Cotton String with Plasma

A piece of cotton string having length of about 10 cm and thickness of about 1.0-about 1.5 mm was subjected to the action of air and oxygen low-temperature plasma. The process was carried out under the pressure of about 9 Pa using the plasma reactor with RF discharge with the following parameters: frequency about 13.56 MHz, power from about 20 to about 140 watts [as disclosed in publication Malek et al. Iranian Polymer Journal 12(4), 271-280 (2003)]. The treatment of cotton fibres with plasma caused their surface changes in the form of loss of mass and on average, a two-fold increase in the number of carboxyl groups.

Thus obtained fibres have enhanced hydrophilic properties due to carboxyl groups formation on the fibres surface.

Example IV

Activation of Cotton String with Plasma

A piece of cotton string having thickness of about 1.0-about 1.5 mm was subjected to the action of air and oxygen low-temperature plasma. The process was carried out under the pressure of about 9 Pa using the plasma reactor with RF discharge with the following parameters: frequency about 13.56 MHz, power from about 20 to about 140 watts [as disclosed in publication Karahan et al., Vol. 17, No. 2 (73) pp. 19-22 (2009)]. The treatment of cotton fibres with plasma caused their surface changes in the form of loss of mass and on average, a two-fold increase in the number of carboxyl groups.

Thus obtained fibres have enhanced hydrophilic properties due to carboxyl groups formation on the fibres surface.

Example V

Activation of Fibre Through the Grafting of Carboxymethyl Group on its Surface

The pieces of strings from cotton, sisal, hemp, flax with the length from about 10 cm and diameter of about 1.0-about 1.5 mm (in the case of raffia-tape with dimensions: length about 10 cm; thickness 1 mm and width 3 mm) were soaked in about 30% NaOH solution for about 30 minutes, and then immersed in about 0.1 M solution of α-chloroacetic acid in the alkaline environment, the process was carried out at temperature of about 60° C. for about 2 hours. After the modification process, the fibres were rinsed two times with deionized water. The fibres obtained in such a way have the sorption capacity increased by more than about 50% compared to the cationic adsorbents. So obtained fibres have enhanced hydrophilic properties due to grafting additional carboxymethyl groups on the surface.

Example VI

Impregnation in Solution of Soluble Polyvalent Metal Compound after the Activation of Hemp Fibre in Accordance with Example I and Coating of Impregnated Fibre with Biopolymer The strings from hemp after the activation described in Example I are soaked in a solution with the concentration of $FeCl_3$ equal to about 0.155 mol·dm$^{-3}$ (also for concentration of about 0.062 and about 1 mol·dm$^{-3}$) for about 5 minutes. After removal from solution and filtering off an excess of salt, the strings are immersed in an about 1.5% solution of sodium alginate for about 1 hour. After gelation of alginate on the string surface, an excess of non-bound biopolymer is washed out through the rinsing in distilled water, and then obtained biosorbents are dried at temperature of about 60° C. for about 2 hours.

In this way alginate crosslinked with the iron ions (hydrogel support) is obtained on the warp from natural plant fibre.

Example VII

Impregnation in a Biopolymer Solution and Crosslinking of Biopolymer with Polyvalent Metal Ions after the Activation of Fibre from Raffia in Accordance with Ex. II The ribbons from raffia after the activation described in Example II are soaked in an about 1.5% solution of sodium alginate (with molecular weight larger than about 100,000 g/mol) for 5 minutes and an excess of alginate is gently impressed and then immersed in an about 0.155M solution of $ZnSO_4$ (also for concentration of about 0.062 and about 1 mol·dm$^{-3}$) for about 1 hour. Subsequently the ribbons are rinsed two times in distilled water and then at temperature of about 60° C. for about 2 hours obtaining a composite fibrous material in the form of alginate crosslinked with the zinc ions (hydrogel support) on the warp from natural plant fibre.

Example VIII

An agent obtained in the same manner as in Example VI, wherein instead of $FeCl_3$ is used a solution of two salts: $ZnCl_2$ and $FeCl_3$ with the concentration of each salt equal to about 0.062 mol·dm$^{-3}$. Flax is used as a fibre and the activation is carried out in accordance with Example III.

Example IX

An agent obtained in the same manner as in Example VI, wherein instead of alginate used is κ-carrageenon of the concentration of about 1.5% (also for concentration of about 2%) and $FeCl_3$ is used with in concentration of about 0.155 mol·dm$^{-3}$ (also for concentration of about 0.062 and 1 mol·dm$^{-3}$) and the activation is carried out in accordance with Example II.

Example X

An agent obtained in the same manner as in Example IX, wherein instead of alginate solution used is a solution of two polysaccharides: alginate and κ-carrageenon, obtained after mixing in the ratio about 1:1 of κ-carrageenon solution with the concentration of about 1.5% and alginate solution with the concentration of about 1.5%. Both solutions were mixed together at a constant stirring rate of about 600 revolutions per minute. Sisal is used as a fibre and its surface activation is carried out in accordance with Example I.

Example XI

An agent obtained in the same manner as in Example VII, wherein instead of alginate used is a xanthate solution having the concentration of about 1.5% and $FeCl_3$ is used in the concentration of about 0.155 mol·dm$^{-3}$ (also for concentration of about 0.062 and about 0.775 mol·dm$^{-3}$) and the activation is carried out in accordance with Example I.

Example XII

An agent obtained in the same manner as in Example IX, while instead of xanthate used is gellan and the activation is carried out in accordance with Example IV.

Example XIII

Impregnation of Fibre Activated in a Mixture of Biopolymer and Sparingly Water-Soluble Polyvalent Metal Compounds and Crosslinking of Biopolymer with Polyvalent Metal Ions The cotton fibres are subjected to the activation in accordance with Example III. The activated strings from cotton are impregnated in a mixture of about 1.5% sodium alginate solution and goethite with the content of about 2 g (also about 6 g and about 10 g) goethite in the about 100 ml of the mixture. The cotton fibres are then immersed in a $CaCl_2$ solution having concentration of about 0.155 mol·dm$^{-3}$. Such modified natural plant fibres are rinsed in water and dried at room temperature obtaining an alginate/goethite matrix gelated with the calcium ions sodium on the warp from cotton with an intensive dark brown colour characteristic for goethite. The so obtained fibrous biosorbents are characterized by an increased rigidity compared to the initial cotton fibres.

Example XIV

Impregnation of Fibre Activated in a Solution of Soluble Polyvalent Metal Compound and Coating of Impregnated Fibre with a Mixture of Biopolymer and Sparingly Water-Soluble Polyvalent Metal Compounds The cotton strings are subjected to the activation in accordance with Example IV. The strings are then immersed in a $ZnSO_4$ solution in the concentration of about 0.155 mol·dm$^{-3}$ for about 5 minutes. After removal from the solution and filtering off an excess of salt, the strings are immersed in a mixture about 1.5% sodium alginate solution and $CaCO_3$ with the content of about 0.5 g of this salt in the about 100 ml of mixture. After gelling of alginate on the string surface, an excess of alginate and $CaCO_3$ is rinsed in distilled water and subsequently the obtained biosorbents are dried at temperature of about 60° C. for about 2 hours obtaining an alginate/$CaCO_3$ matrix (hydrogel support) crosslinked with the zinc ions on the warp from natural plant fibre.

Example XV

An agent obtained in the same manner as in Example XIV, wherein instead of a mixture of about 1.5% sodium alginate solution and $CaCO_3$ with the content of about 0.5 g of this salt in the about 100 ml of mixture used is a mixture of about 1.5% sodium alginate solution and $CaCO_3$ and $MnO_2$ (1:1) with the content of about 0.5 g of each compound in about 100 ml of alginate solution. An alginate/$CaCO_3$/$MnO_2$ matrix (hydrogel support) crosslinked with the zinc ions on the warp from natural plant fibre is obtained.

Example XVI

Water originating from eutrophic polymictic inland water basin was enriched with $KH_2PO_4$ up to the concentration of about 10 $mgPO_4 \cdot dm^{-3}$. The prepared solutions containing the phosphate ions were measured out in about 50 ml to the Erlenmeyer flasks closed with ground joint and then added was a string prepared according to Examples VI-XV. The control samples without the adsorbent were prepared in the same manner. All the tests were made in triplicate. The adsorption process proceeds at a temperature of about 20° C., the changes of the phosphate ions content in the solutions were studied after attaining the equilibrium state (about 48 h). Table 2 presents the phosphate ions adsorption by the composite fibrous supports according to the embodiments disclosed herein.

TABLE 2

The sorption capacity of phosphorus of thus obtained composite fibrous supports

| Adsorbent | Example | Biosorbent mass [g dry matter] | Adsorption [mgP · g⁻¹ dry matter of biosorbent] |
| --- | --- | --- | --- |
| hemp/$FeCl_3$/alginate | VI | 0.120 | 1.07 |
| raffia/alginate/$ZnSO_4$ | VII | 0.087 | 1.51 |
| flax/$ZnCl_2$/$FeCl_3$/alginate | VIII | 0.112 | 1.16 |
| hemp/$FeCl_3$/ κ-carrageenon | IX | 0.122 | 1.07 |
| sisal/$FeCl_3$/alginate κ-carrageenon | X | 0.103 | 1.27 |
| hemp/xanthate/$FeCl_3$ | XI | 0.099 | 1.24 |
| hemp/gellan/$FeCl_3$ | XII | 0.128 | 1.07 |
| cotton/alginate + goethite/$CaCl_2$ | XIII | 0.178 | 0.67 |
| cotton/$ZnSO_4$/alginate + $CaCO_3$ | XIV | 0.158 | 0.65 |
| cotton | XV | 0.188 | 0.70 |

All references cited herein are incorporated by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supercede and/or take precedence over any such contradictory material.

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings, if any. Such modifications are intended to fall within the scope of the appended claims. All publications cited herein are incorporated by reference in their entirety.

What is claimed is:

1. A method comprising:
   a. activating a cellulose material;
   b. coating the activated cellulose material with an ionic biopolymer;
   c. coating the cellulose-biopolymer coated material with at least one water-soluble polyvalent metal compound;
   d. cross-linking the cellulose-biopolymer material and the at least one water soluble polyvalent metal compound to obtain a composite fibrous hydrogel support material; and
   e. removing dissolved phosphorus compounds from water using the composite fibrous hydrogel support material.

2. The method according to claim 1, wherein said ionic biopolymer includes at least one sparingly water-soluble polyvalent metal compound.

3. The method according to claim 2, wherein said sparingly water-soluble polyvalent metal compound is selected from the group consisting of calcium carbonate, calcium hydroxide, iron(II) carbonate, manganese(II) carbonate, manganese (II) hydroxide, manganese(IV) oxide, oxides of iron including magnetite, hematite, limonite, goethite, and hydroxides of iron including magnetite, hematite, limonite, goethite.

4. The method according to claim 1, wherein activating cellulose material comprises at least one oxidation, mercerization, the modification by plasma, or the chemical grafting of carboxymethyl groups.

5. The method according to claim 1, wherein the coating of the activated cellulose material with the biopolymer with the ionic character comprises at least one of an immersed method, a spraying technique, or a combined immersed and spraying method.

6. The method according to claim 1, further comprising drying the composite fibrous hydrogel support material.

7. The method according to claim 1, wherein said ionic biopolymer is selected from a group consisting of alginate, κ-carrageenon, xanthate, gellan, agar, pectin, and derivatives thereof.

8. The method according to claim 1, wherein said water-soluble polyvalent metal compound is selected from the group consisting of calcium bicarbonate, calcium chloride, calcium nitrate(V), calcium acetate, calcium oxalate, calcium formate, iron(III) chloride, iron(II), iron(III), nitrate(V), iron (II) nitrate(V), iron(III) sulphate(VI), iron(II) sulphate(VI), iron(II) sulphate(VI), iron(II) oxalate, iron(II) acetate, iron (III) oxalate, zinc sulphate(VI), zinc chloride, zinc nitrate(V), and zinc acetate.

9. The method according to claim 1, wherein said cellulose material is selected from the group consisting of the fibres of cotton, sisal, hemp, flax, and raffia.

10. A method comprising:
a. activating a cellulose material;
b. coating the activated cellulose material with at least one water-soluble polyvalent metal compound;
c. coating the cellulose-water-soluble polyvalent metal compound material with an ionic biopolymer;
d. cross-linking the cellulose-biopolymer material and the at least one water soluble polyvalent metal compound to obtain a composite fibrous hydrogel support material; and
e. removing dissolved phosphorus compounds from water using the composite fibrous hydrogel support material.

11. The method according to claim 10, wherein said ionic biopolymer includes at least one sparingly water-soluble polyvalent metal compound.

12. The method according to claim 11, wherein said sparingly water-soluble polyvalent metal compound is selected from the group consisting of calcium carbonate, calcium hydroxide, iron(II) carbonate, manganese(II) carbonate, manganese(II) hydroxide, manganese(IV) oxide, oxides of iron including magnetite, hematite, limonite, goethite, and hydroxides of iron including magnetite, hematite, limonite, goethite.

13. The method according to claim 10, wherein activating cellulose material comprises at least one oxidation, mercerization, the modification by plasma, or the chemical grafting of carboxymethyl groups.

14. The method according to claim 10, wherein the coating of the activated cellulose material with the biopolymer with the ionic character comprises at least one of an immersed method, a spraying technique, or a combined immersed and spraying method.

15. The method according to claim 10, further comprising drying the composite fibrous hydrogel support material.

16. The method according to claim 10, wherein said ionic biopolymer is selected from a group consisting of alginate, κ-carrageenon, xanthate, gellan, agar, pectin, and derivatives thereof.

17. The method according to claim 10, wherein said water-soluble polyvalent metal compound is selected from the group consisting of calcium bicarbonate, calcium chloride, calcium nitrate(V), calcium acetate, calcium oxalate, calcium formate, iron(III) chloride, iron(II), iron(III), nitrate(V), iron (II) nitrate(V), iron(III) sulphate(VI), iron(II) sulphate(VI), iron(II) sulphate(VI), iron(II) oxalate, iron(II) acetate, iron (III) oxalate, zinc sulphate(VI), zinc chloride, zinc nitrate(V), and zinc acetate.

18. The method according to claim 10, wherein said cellulose material is selected from the group consisting of the fibres of cotton, sisal, hemp, flax, and raffia.

* * * * *